US009886465B2

(12) United States Patent
Lucca et al.

(10) Patent No.: US 9,886,465 B2
(45) Date of Patent: Feb. 6, 2018

(54) SYSTEM AND METHOD FOR RENDERING OF HIERARCHICAL DATA STRUCTURES

(71) Applicant: Halogen Software Inc., Kanata (CA)

(72) Inventors: Marcio Denis Lucca, Kanata (CA); Chii Jaw Sheu, Ottawa (CA); Hawley Kane, Ottawa (CA)

(73) Assignee: HALOGEN SOFTWARE INC., Kanata, Ontario (CA)

( * ) Notice: Subject to any disclaimer, the term of this patent is extended or adjusted under 35 U.S.C. 154(b) by 363 days.

(21) Appl. No.: 14/583,271

(22) Filed: Dec. 26, 2014

(65) Prior Publication Data

US 2016/0042021 A1 Feb. 11, 2016

Related U.S. Application Data

(60) Provisional application No. 62/035,054, filed on Aug. 8, 2014.

(51) Int. Cl.
*G06F 17/00* (2006.01)
*G06F 17/30* (2006.01)
*G06T 11/20* (2006.01)

(52) U.S. Cl.
CPC ...... *G06F 17/30327* (2013.01); *G06T 11/206* (2013.01)

(58) Field of Classification Search
CPC .... G06F 17/30; G06F 17/00; G06F 17/30067; G06F 17/30327
USPC .................................................. 707/600–899
See application file for complete search history.

(56) References Cited

U.S. PATENT DOCUMENTS

2011/0138340 A1\* 6/2011 Holm-Petersen ...... G06Q 10/06
715/854

\* cited by examiner

*Primary Examiner* — Isaac M Woo
(74) *Attorney, Agent, or Firm* — Nixon & Vanderhye P.C.

(57) ABSTRACT

The rendering of hierarchical data having large number of nodes, such as organizational charts, can present challenges based upon the browser technology utilized. Rendering of thousands of nodes can be memory intensive and provide poor performance when rendered in a browser. A method of rendering hierarchical data in a browser is provided. Node data from a datastore associated with human resources management software is retrieved. Each item of node data is associated with an employee of the associated organization. A viewport for the hierarchical data structure is determined based upon the computing device used for viewing the hierarchical data structure. Coordinates for nodes in the hierarchical structure based upon their relative position in the hierarchy and a configuration of the view port can then be determined and rendered.

18 Claims, 9 Drawing Sheets

SYSTEM AND METHOD FOR RENDERING OF HIERARCHICAL DATA STRUCTURES

CROSS-REFERENCE TO RELATED APPLICATIONS

This application claims priority from U.S. Provisional patent application No. 62/035,054 filed on Aug. 8, 2014 the entirety of which is hereby incorporated by reference for all purposes.

TECHNICAL FIELD

The present invention relates to rendering of data structures and in particular to a system and method for rendering of hierarchical data structures containing a large number of nodes such as organizational charts.

BACKGROUND

Hierarchical data structures that have many nodes can present rendering problems in how to present the data efficiently with many different web browsers. In data sets have 1000's to 10000 of nodes the ability to render the data can be limited without using rendering tools. However the rendering tools may not be available on all platforms resulting in performance issues. In large organizations each employee may be defined as a node. In the rendering of an organizational chart the employees can be arranged hierarchically.

Browsers were not designed to do animations on. For example, unlike graphical libraries, browsers don't give programmers things like "back buffers", "transformation pipelines" or direct access to the "GPU". In a browser, whenever you make a change to an element programmatically those changes are immediately applied on the screen and that is not very efficient when you need to make lots of changes on each individual frame of animation. The very concept of "frames of animation" is something not typically supported by browsers.

Rendering lots of elements in a web page can be very challenging as the increasing number of elements decreases performance. The way a browser structures elements on a page is very powerful and flexible. Both the Document Object Model (DOM) and Cascading Style Sheets (CSS) trees allow graphical designers to create very rich and stunning looking web pages. However, that flexibility and power comes at the cost of less than optimal performance. The more elements are displayed in a web page, the more this problem is noticeable. This means that creating a large org tree to go together with a large application like ours did represent a big challenge in terms of the number of visual elements that need to be displayed. New developments in web technology like HyperText Markup Language (HTML) 5 supports such ability however a requirement to support older browsers by an application removes the ability to leverage newer technologies.

Accordingly, improved systems and methods that enable effective rendering of large hierarchical data structures across platforms remains highly desirable.

BRIEF DESCRIPTION OF THE DRAWINGS

Further features and advantages will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-9.

In accordance with an aspect of the present disclosure there is provided a method of rendering hierarchical data structures, the method comprising: retrieving node data from a datastore, the datastore associated with a human resources management software, each item of node data representing an employee within an organization defining a hierarchical data structure; determining a viewport for the hierarchical data structure based upon parameters of a browser used for viewing the hierarchical data structure; determining coordinates for nodes in the hierarchical structure based upon relative positions in the hierarchy and a configuration of the viewport; and rendering each node of the data structure defined within the viewport using the parameters for rending the hierarchical data structure to generate an organizational chart on a display of a computing device.

In accordance with another aspect of the disclosure there is provided a non-transitory computer readable memory containing instructions for rendering hierarchical data structures which when executed by a processor perform: retrieving node data from a datastore, the datastore associated with a human resources management software, each item of node data representing an employee within an organization defining a hierarchical data structure; determining a viewport for the hierarchical data structure based upon parameters of a browser used for viewing the hierarchical data structure; determining coordinates for nodes in the hierarchical structure based upon relative positions in the hierarchy and a configuration of the viewport; rendering each node of the data structure defined within the viewport using the parameters for rending the hierarchical data structure to generate an organizational chart on a display of a computing device.

Figure 1:
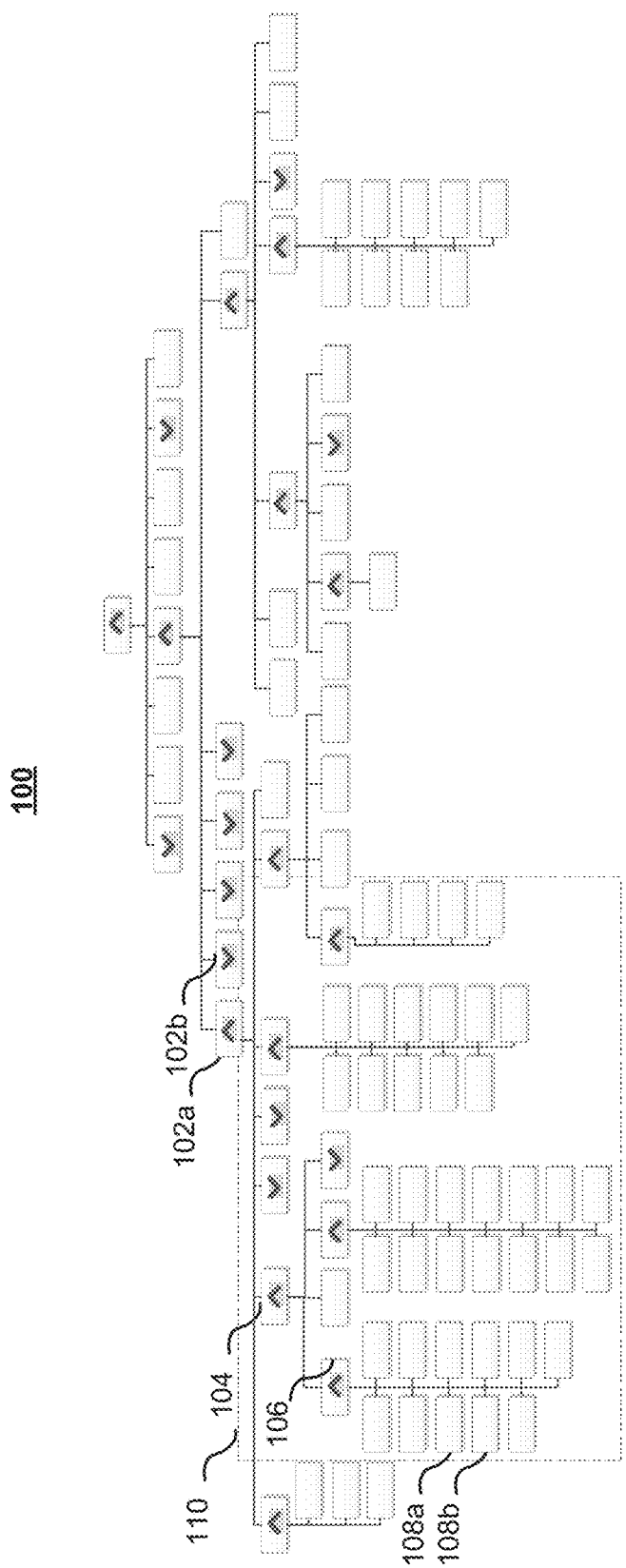
FIG. 1 is a schematic representation of a hierarchical structure.
Figure 2:
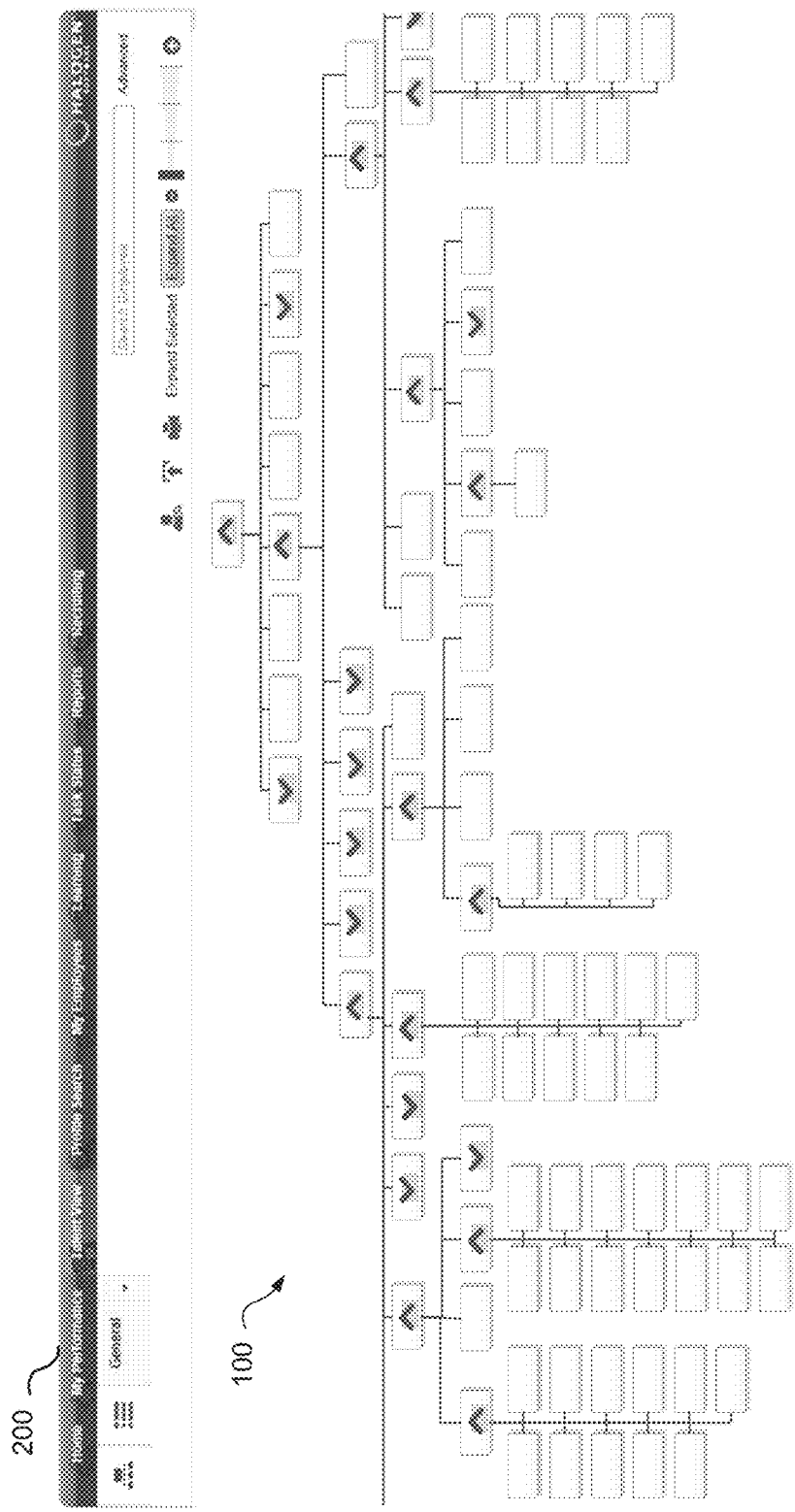
FIG. 2 shows an organization chart structure in a browser at a first detail level.

The tool described provides the ability to draw huge trees (in excess of 10000 nodes); ability to pan/scroll the chart using the mouse; ability to maximize the number of nodes visible in one screen in hierarchical structures such as an organization chart 100 as shown for example in FIG. 1. Each node can be defined with a hierarchy based upon peer nodes and dependent nodes. For example multiple nodes 102*a* and 102*b* are peer nodes. Node 102*a* has dependent or child node 104. Node 104 has further dependent node 106 having children nodes 108*a* and 108*b*. The organization chart 100 can be displayed in a browser display 200 as shown in FIG. 2 at an initial level of detail. Depending on the size of the organization chart view and navigation can be difficult. The organization chart 100 can be generated from human resource management software where each node is associated with an employee within the organization. The human resource management software can store information on employees within an organization such as their title, position within the organization, contact information and job related details. The employee data can be navigated and rendered to create an organizational chart identifying the employees and their relationship within the organization.

Figure 3:
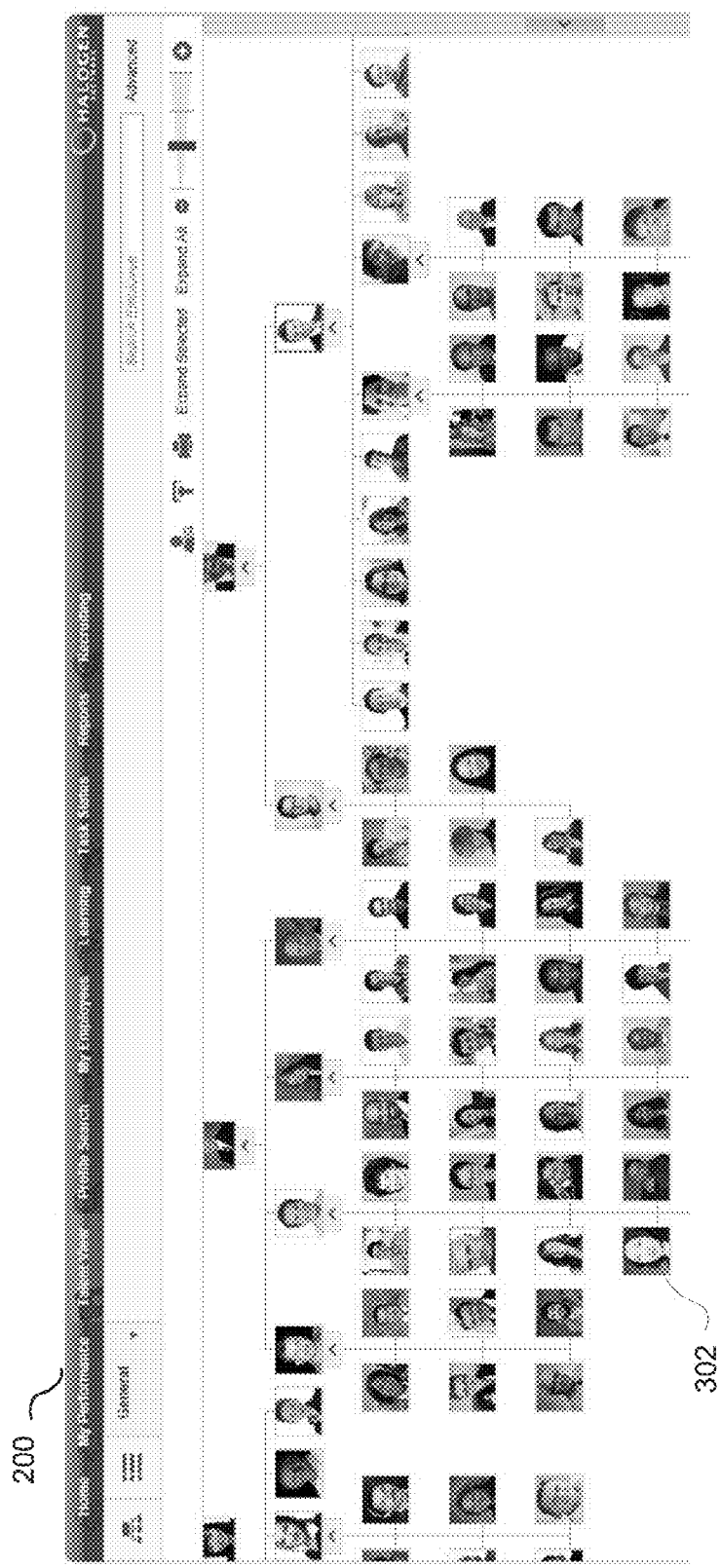
FIG. 3 shows an organization chart structure in a browser at a second detail level.
Figure 4:
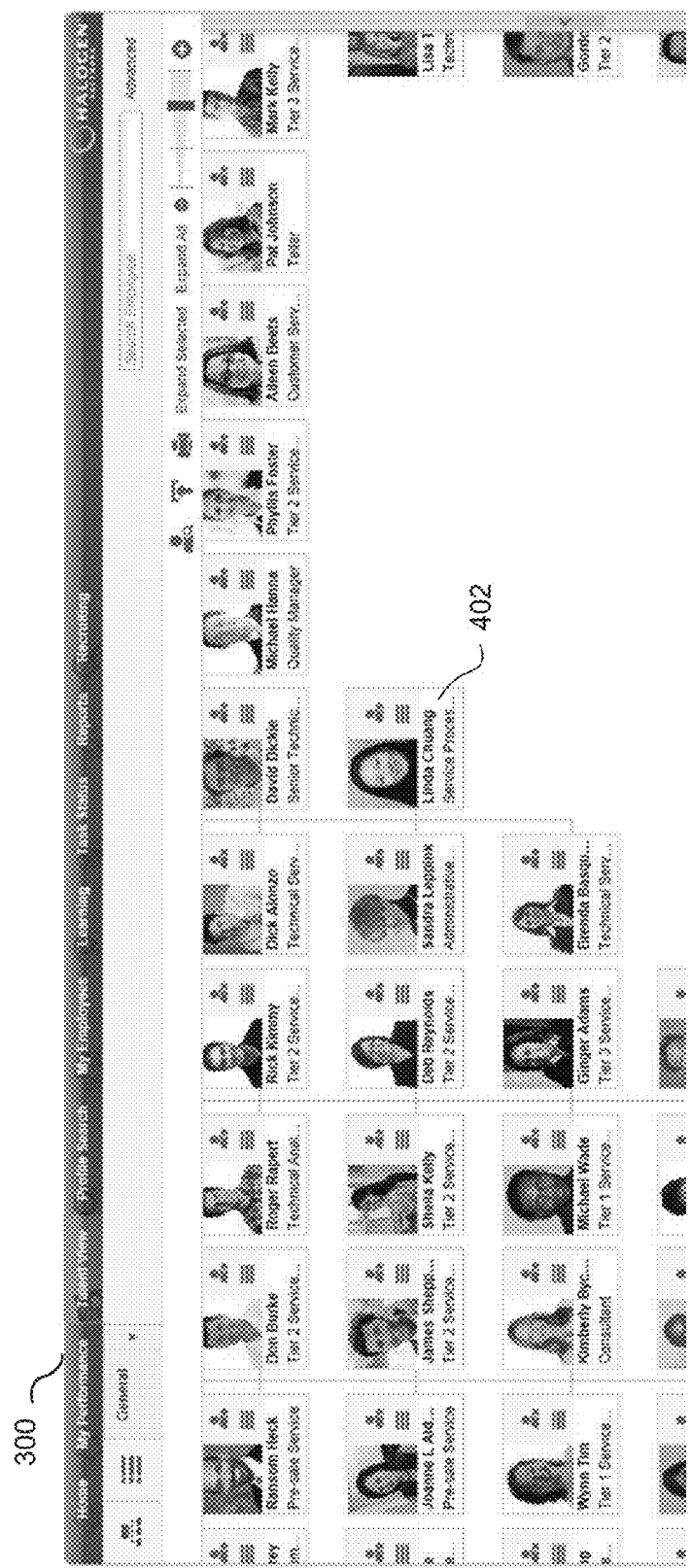
FIG. 4 shows an organization chart structure in a browser at a third detail level.
Figure 5:
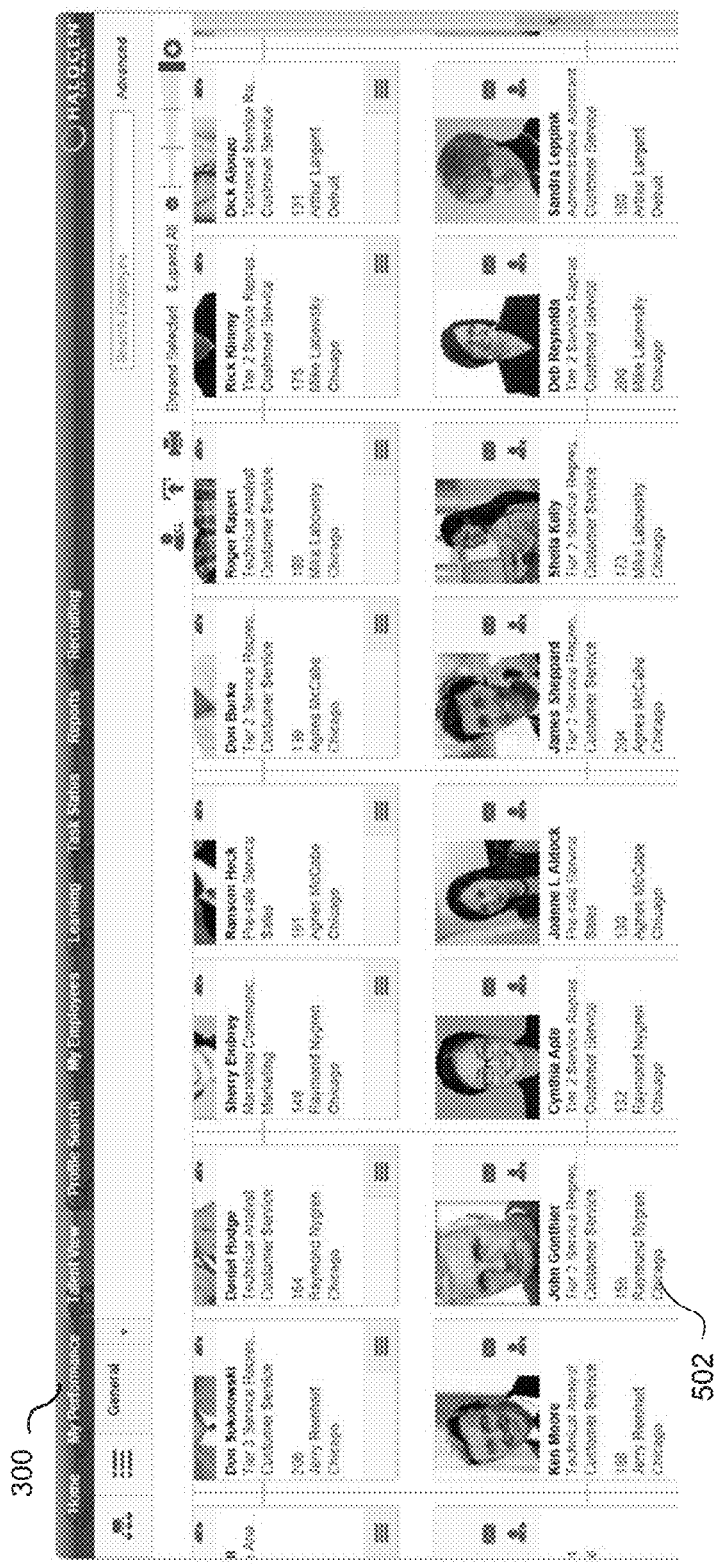
FIG. 5 shows an organization chart structure in a browser at a fourth detail level.

The system and method described allows for nodes, also defined as leaves, to be drawn efficiently minimizing processing requirements, the ability to zoom in and out of the hierarchy efficiently and performs over a range of browser technologies. The disclosed system and method utilizes HyperText Markup Language (HTML) as a presentation technology. In traditionally large datasets the rendering in HTML can be extremely slow and re-positioning problematic. The system and method are described in relation to human resources organizational chart presentation and enables improved rendering speed and interaction. Referring to FIG. 3 the organization chart is presented in browser or application 300, each node 102, 104, 106 can each be presented with a first level of detail 302 such as a picture to represent a person within an organization and provide a visual representation of their hierarchy within the organization. Any object that can be represented as a node and can be hierarchically organized can be presented within the system. In determining the viewport to be provided the hierarchy must be created to enable the specific nodes to be displayed. The viewport defines a portion of the hierarchical structure that is presented on the display. The viewport can be moved by navigation to show different parts of the structure. As the user zooms in as shown in FIG. 4, the browser provides a subset of the hierarchy. Each node 402 may provide a second level of detail but must be maintained within the overall hierarchy structure. The second level of detail may include a name and/or a position of each person defined by the node. The additional detail is retrieved from the human resources database. As shown in FIG. 5 the increased zoom level provides a third level such as node 502. The third level of detail may provide for example additional information such as name, position, division, supervisor and contact information.

Figure 6:
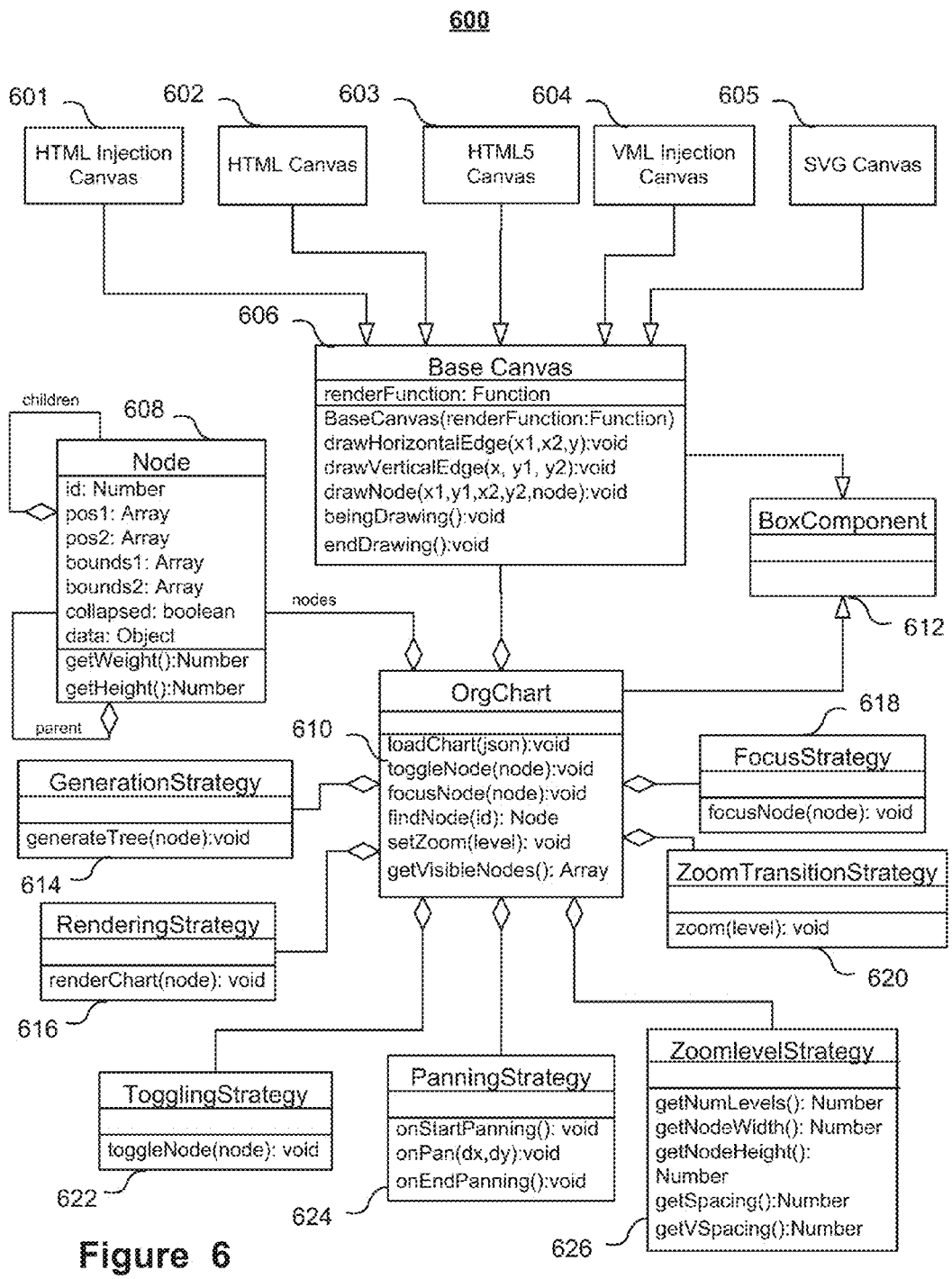
FIG. 6 shows a representation tool components implemented by the system for providing hierarchical data structures tool.

Referring to FIG. 6, a representation of tool components implemented by the system for providing hierarchical data structures tool is shown. The tool implements design principles of componentization, flexibility, low coupling, implementation strategies, and specialization.

Componentization: aspects of the tool can be componentized into function blocks such as: drawing 606 (presentation technology), node generation 614 (calculation of coordinates for each node), rendering 616 (glue between generation and drawing), panning, toggling 624 (expanding/collapsing sub-trees), focusing 618 (selecting a node so its focused/centered on the screen) and zooming 626.

Flexibility: this componentization provides a flexible design in which different component implementations may be assembled together to ultimately create org charts.

Low Coupling: each component is designed with low coupling in mind to enable switching of one component at a time and not graphs of interdependent components.

Strategies: this design is based on the "Strategy" design pattern with the idea that, for example, if the "Generation" strategy/algorithm is switched, everything else in the org chart will continue working fine, the chart will only be drawn differently or will behave slightly differently. The strategies can be provided by components provided in software either logically or structurally. The components may be further separated or combined as required.

Specialization: because different browsers support a different set of technologies and application programming interface (API)'s, by componentizing the system can take advantage of specific browser features (e.g. Canvas API, SVG, VML, etc).

The main component that represents the organizational chart tree structure is the node. Nodes can be relatively simple, they can contain only an identifier, a flag to say whether the node is collapsed or not, coordinates for rendering the node and its edges (the lines that connect the nodes), and finally, data provided by the programmer (user of the API) or can be extracted from an external source.

A representation 600 of the components utilized for providing a hierarchical data structure such as an organizational chart is provided. Coordinates are stored in nodes 608 using arrays with four positions: x1, y1, x2, y2, which represent the top-left and bottom-right corners of a rectangle. The actual position of a node 608, as calculated by a generation strategy, is stored in property pos1. Before new values are calculated and stored in post the tool will make a copy of the current value, storing it in pos2. Only one of the two properties is active at all times. The need for two properties is so that one can be used as a starting position and the other one as an ending position in morphing rendering strategies. The OrgChart component 610 defines which one is the active one (end position) and informs that to the other components that need this information. The OrgChart component 610 switches these two positions every time a new tree structure needs to be recalculated (in general, as a result of the user collapse/expanding a node in the tree). The reason this copy is made is so that morphing rendering strategies can smoothly transition the node from one position to another by the zoom transition component 620. Another property stored in a node 608 is called bounds. This property stores the coordinates of a bounding box that surrounds a node and all of its children. The reason this information is needed is for clipping, as will be further described. Just like pos, there are two bounds properties, one for a starting structure and another one for an ending structure.

The generation strategy is responsible for calculating the coordinates for each node in the tree. The algorithm must calculate the position of each node (property "pos1") and the bounds of each node/sub-tree (property "bounds1"). If the method needs to use "post" or "pos2", "bounds1" or "bounds2" will depend on what the OrgChart component 610 tells the component the current active number is.

A restriction may be created that nodes must always contain the same width and heights. By removing a little bit of flexibility in the size of nodes a few performance gains can be made when calculating positions. This means, among other things, that calculating Y coordinates will basically be the same for all generation strategies and, for that reason, a utility class called YValueCalculator is provided to simplify things.

So in general, all that a generation strategy needs to do is calculate the X coordinates of all nodes and then use YValueCalculator to calculate and store the Y values.

Finally, generation strategies are not responsible for calculating the coordinates for the edges (lines) in an org chart. The reason is because clipping does not take place in this layer. If it did it the positions of all the edges for all the nodes in the tree would need to be calculated, and that would degrade performance. In addition, in an organizational chart there are many more edges than there are nodes to draw. The generation strategy also ensures that nodes do not occupy the same coordinates or do not overlap.

There are a few types of generation strategies that can be implemented. The first one can be very simple, rendering leaves horizontally and making sure no leaves overlap each other (in terms of their "x" coordinates). The second strategy is to do the same as the first one, but this time rendering leaves vertically. Another strategy is to have the ability for different leaves to occupy the same "x" coordinates, as long as they belong to different levels (different "y" coordinates). Depending on the client's browser and computer power, different rendering implementations may be selected to provide a better experience to users with powerful browsers and/or computers.

BottomUpNonOverlappingStrategy renders leaves horizontally, making sure no leaves overlap each other (in terms of their "x" coordinates).

BottomUpNonOverlappingStrategyVerticalLeaves basically does the same as the first one but it renders leaves vertically.

Differently than the first two, BottomUpOverlappingStrategy has the ability to position different leaves on the same "x" coordinates, as long as they belong to different levels (different "y" coordinates).

There are also BottomUpOverlappingStrategyVerticalLeaves and BottomUpOverlappingStrategyVerticalLeaves2 that are small variations of BottomUpOverlappingStrategy.

Depending on the client's browser and computer power these implementations can be switched to provide a better experience to users with less powerful browsers and/or computers.

The rendering component 616 is the algorithm that iterates through all the nodes in a chart and draws them, along with their edges, on a canvas object. At the rendering component layer is where clipping occurs for the first time. Clipping in an org chart means that nodes/sub-trees doesn't need to be drawn that are sitting outside of the current viewport (the visible portion of the chart that you can see in your computer screen). As the tree structure is traversed the bounds are determined to see if the current node/sub-tree intersects with the viewport. If yes, this means the rendering component must try to render that node in the organizational chart canvas and then proceed to the children of that node. If no, the viewport does not intersect with the bounding box of a node, this means that the entire sub-tree can be discarded starting at the node being processed. In large trees, this technique is very effective as most nodes in the tree won't even need to be traversed (since large org charts are often very wide). Essentially, this is where performance gains are made in the rendering of the tool, especially when very large trees are processed (when trees are small, with less than 100 nodes, then the performance gains are marginal).

Finally, as stated in previous sections, the edges in an org chart are not calculated by the generation component 614, but can be done by the rendering component 616. Because invisible nodes are clipped off, this means edges for sub-trees that are not visible do not need to be calculated. Instead of calculating edge positions for thousands of edges, this allows the positions to be calculated of only a few hundred. Another advantage of this design is that the edge positions inside each node do not need to be stored, which saves significant amount of memory.

The panning component 624 is the algorithm used when the user clicks on the org chart and drags it around the screen. These are some of the strategies that can be implemented:

Listen to the mouse move event, or touch input, and then calculate the position of the viewport based on how much the user moved the mouse away from the click position and then re-render the org chart in the final position. This is what "ViewportPanningStrategy" does.

Listen to the mouse move event, or touch contact, and then calculate the speed at which the viewport should be moving around. The viewport can then be animated to move in the direction of the movement of the mouse or touch contact. When the user releases the mouse button, or touch contact, the viewport can continue moving a little bit and then finally come to a halt (similar to how scrolling works in mobile devices).

The two previous strategies are not feasible in slow computers running older browser technology such as IE7. To make things faster, as the user moves the mouse, only the initially visible nodes are drawn and when the user releases the mouse button then re-draw the whole thing. The component that does that is called PositionPanningStrategy.

The toggling component 622 defines what to do when the user expands/collapses nodes in the org chart. At least two strategies are provided:

Animated component: when a node is collapsed, the nodes that were collapsed are hidden and then morph the tree into its new position (making sure the selected node keeps its original position inside the viewport). When a node is expanded, first the tree is morphed into its final position and then the nodes are shown that were expanded for example as implemented in "AnimatedTogglingStrategy". A variation of this component is to animate showing and hiding the children of the node being expanded/collapsed (toggled) in different ways: no animation at all, fade-in and out, fly in and out, etc.

Non-animated Strategy: with this component the chart is redrawn in its final position without an animation.

Finally, different strategies could be created to draw the edges or not during animation/morphing. The approach that was taken for this at the moment is to not draw the edges during animations.

The focusing component 618 defines the behavior when the user wants to focus or frame a certain node in the org chart. Focusing will make sure the node the user is interested in is centered on the screen, regardless of where that node is located on the chart. These are some of the strategies that can be implemented:

Redraw: the viewport is moved to the correct position (with the node of interest centered in it) and then redraw the org chart. This is what "{{NormalFocusStrategy}}" does.

Fly-To: calculates the final position of the viewport and then animate/morph the viewport from its original position to its final position.

Mix of Both: a strategy can be implemented that is the mix of the previous two.

If the viewport is moving to a location that is too far from its starting location, re-position once and redraw. Otherwise the viewport can be animated from its initial to its final position. This is what "FlyingFocusStrategy" does.

The concept of zooming allows the user to see the org chart at different levels of detail. Bigger zoom levels (showing big nodes/cards) can present lots of information about a node whereas small levels may only a small box with a picture, for example. The additional information can be retrieved from the human resources management system or other corporate information systems. Each zoom level can be associated with a level of detail and data presented with each node object. As the level increases more detail from the organizational data can be retrieved for display.

There are two types of strategies associated to zooming. The first one, ZoomLevelStrategy component dictates how metrics (node width, height, spacing, vertical spacing, etc) are calculated for each zoom level. A DiscreteZoomLevelStrategy component uses discrete metrics specified manually by the user. Because these metrics are specified manually this means that zooming in and out does not maintain the chart's original aspect ratio. A zoom level component can be provided in which the user only specifies an aspect ratio, the number of levels they want and the initial size. This component then calculates the metrics automatically and would guarantee constant aspect ratio, which in turn provides a much smoother and precise experience when zooming in and out.

A second type strategy implemented by ZoomTransitionStrategy component 620, dictates how the actual zooming (transition from one level to the next) takes place. There are two strategies that can be utilized:

Non-Animated Zooming: zooming takes place directly from one level to the next. There are no animations, the current zoom level is changed as the user zooms in and out and then redraw at the new level for example as implemented in "DirectZoomTransitionStrategy" component.

Animated Zooming: When changing from one zoom level to the next, the nodes can be morphed from their initial size to the final size. An interface is provided for the programmer to specify what to render as the transition takes place. This method would provide a smoother experience to the user, preventing them from getting lost when transitioning between two levels that are greatly different in size.

The canvas component 606 is an interface through which edges and nodes are drawn. The presentation technology used to render the org chart is abstracted enabling different technologies to be utilized. Rendering strategies don't care about whether they're rendering to an HTML div, an SVG image, or an HTML5 canvas object. The canvas object provides that layer of abstraction in the Org chart tool described. The canvas component can utilize one or more of the following implementations:

HTMLInjectionCanvas 601: creates an HTML snippet (a string) with all the nodes and edges in it and then "injecting" that into a containing DIY's "innerHTML" property. The nodes and edges would be represented as absolutely positioned DIVs.

HTMLCanvas 602 similar to HTMLinjection, but this time using the DOM API to create the nodes and edges. The DIVs for the nodes are created and appended to a containing DIV.

HTML5Canvas 603 renders the nodes and edges using the HTML5 canvas API.

VMLInjectionCanvas 604 renders the nodes and edges in a Vector Markup Language (VML) element (for IE 7 and 8).

SVG Canvas 605 renders the nodes and edges as a Scalar Vector Graphics (SVG) image (snippet).

Canvas implementations are encouraged to do clipping themselves. This means that if the user is trying to render a node or edge outside of the canvas' viewport (and viewport is another aspect managed by the canvas itself), then the canvas can safely discard those nodes and edges.

Because drawing technologies are so distinct (some are document based, some are API based), each canvas implementation provides an interface to enable definition of how to draw the contents of each node. For the same reason, each canvas implementation will need to define how the user will interact with the nodes (i.e. clicking on a button drawn as an HTML button is totally different then clicking on a rectangle—representing a button—drawn in an SVG or HTML5 Canvas object).

A composite canvas implementation can be utilized, one that delegates drawing edges to one type of canvas and nodes to another. A composite canvas would contain two canvases within it, one on top of the other. In an embodiment the edges of a chart can be drawn in an HTML5 canvas and the nodes in an HTML canvas.

The Orgchart component 610 is the main component in generating the organizational chart. This is the class is instantiated in order to create an org chart. The class itself defines a set of interfaces for loading an org chart, drawing its nodes, toggling its nodes, serializing the data into a JSON string, etc.

The OrgChart component 610 is also the aggregator of all the different components/strategies described in the sections above. When instantiating the OrgChart for each method, what class/component to use and then configure the method accordingly can be specified. Of course, The OrgChart component does contain sensible defaults out of the box in order to simplify the creation of a new chart.

The generation performance can be degraded in detriment of rendering performance. Generation only takes place when the user changes the structure of the tree, which at the time of writing only happens when they expand/collapse nodes. When the user does that, they are expecting that the tree is being recalculated, which means a little bit of delay will be tolerated better. Now, after an animation starts, or during panning, for example, poor performance will be fairly easily visible and is a lot less likely to be tolerated. This means, in most cases, it may be worth it to spend more time doing pre-processing (during generation) and avoid certain computations during the rendering phase.

Inheritance may be slow in JavaScript (ExtJS). Whenever a call to a function from a super class is required, this may be rather slow, especially if this operation is called lots of times. The solution to that is to use composition wherever possible and even copying/pasting at time, generation is one example where it can be done. When possible, arrays are used instead of objects to store things. Accessing indexes in an array is faster than accessing properties in an object; this is why some properties in the Node class are defined as arrays.

Figure 7:
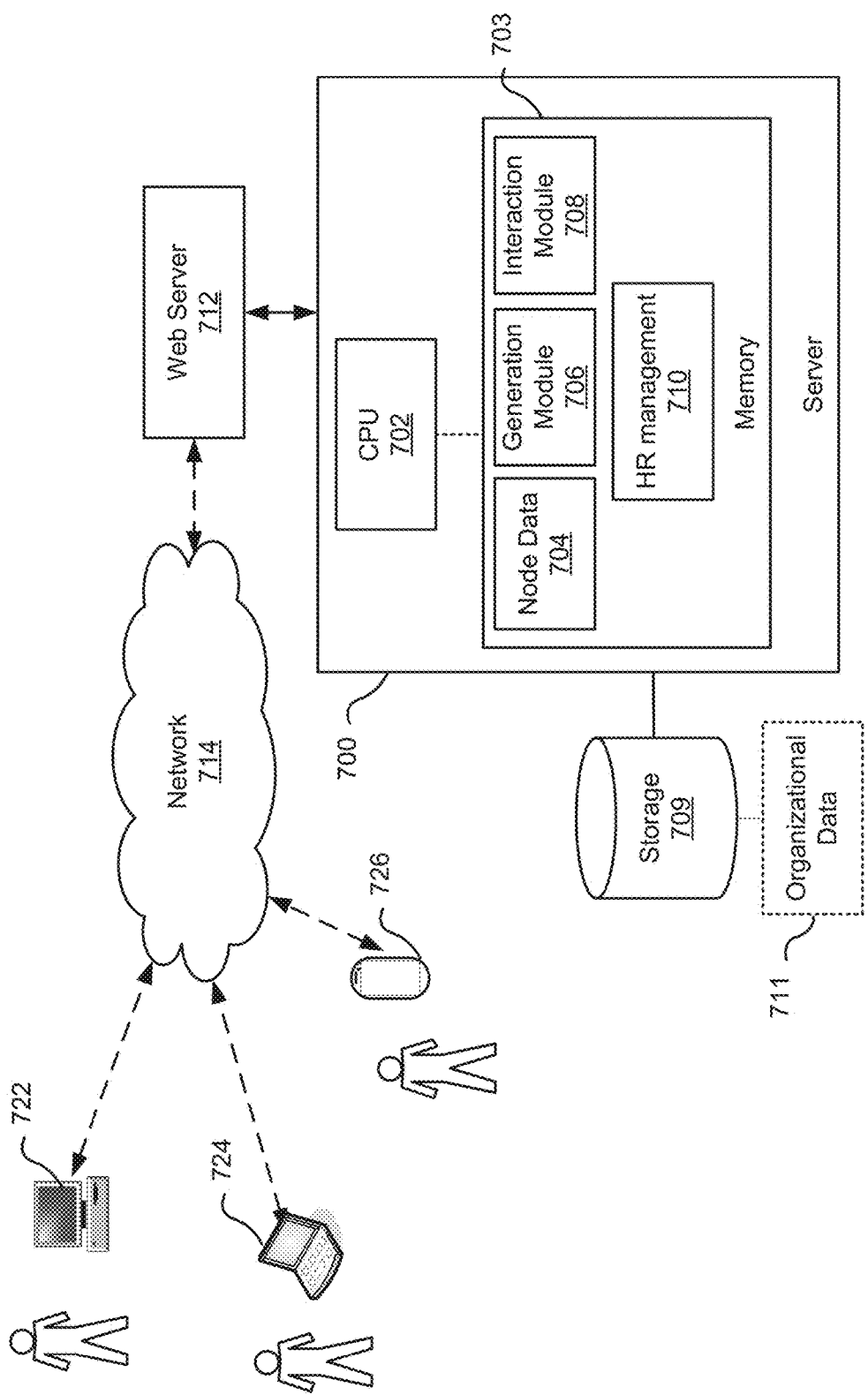
FIG. 7 is a representation of a system for rendering of hierarchical data structures.

FIG. 7 is a representation of a system for rendering of hierarchical data structures. The server 700 comprises a computing device for retrieving, storing and processing data. The server 700 may be implemented as computer software in the form of computer readable code executed. The server 700 comprises central processing unit (CPU) 702 and memory 703. The CPU may be a single processor or multiprocessor system. In various computing environments, main memory 703 and storage 709 can reside wholly in a computer environment, or they may be distributed between multiple computers.

The computer processor 702 or similar device may be programmed in the manner of method steps, or may be executed by an electronic system which is provided with means for executing these steps. The storage device 709 includes a database 710. The database may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing these method steps may also be transmitted via a communication network.

The server 700 may comprise multiple modules providing one or more components which reside in memory 703, for example a node data module 704, generation module 706 and interaction module 708. The node data module 704 is utilized to retrieve data for generation of nodes in the hierarchical or organizational chart. The node data may be provided by a human resources management system defining hierarchy within a company. The generation module 706 is utilized to determine and generate rendering data to present the organizational chart and implement the components of FIG. 6. An interaction module 708 is used to determine input or interaction with the browser interface and provide changes by the generation module 706 for rendering and updated display. The software modules may reside on separate systems of within the same system. The system may also execute human resource management software 710 for storing and generating organizational data 711. Each of the modules stores and retrieves data from storage 709. The storage device 709 stores instructions for execution of the modules and data for rendering the node data and can also store organizational data 711.

The web server 712 generates and displays web pages for browsers in HTML, HTML5, XML, JSP, JavaScript, DHTML, etc. The web server 712 is accessed by a data network 714, which may be an internal network or an external network such as the internet. The hierarchical data is referenced by an information resource is identified by a Uniform Resource Identifier (URI/URL) containing code for rendering web content providing the organizational chart. The URI/URL can be embedded in an application or part of a web page. The server 712 functionality may be part of the server 700 or vice versa. Alternatively one or more functions may be distributed to computers coupled to the network 714 or integrated into browsers provided on the clients 722, 724, 726. Each of the groups may access the system by devices such as personal computers, laptops, notebooks, tablets or smart phones which provide a web enabled interface, or web based applications and can access network 714. Depending on the role of the user accessing the tool the information provided may be modified or tailored.

Figure 8:
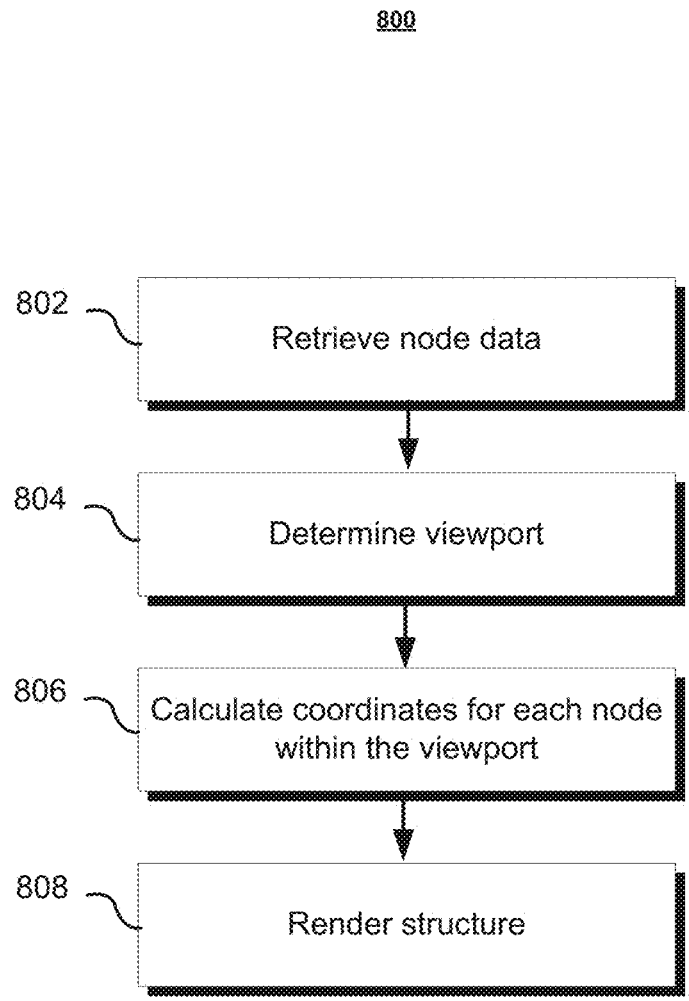
FIG. 8 is a method for rendering hierarchical data structures.

FIG. 8 is a method of rendering of hierarchical data structures. The method 800 comprises retrieving the node data from a datastore (802). Determining viewport for the hierarchical data structure (804) from the computing device. Calculating coordinates for each node in the tree (806) associated with the hierarchical data and rendering the data structure (808) using the viewport data and coordinates for each node and clipping nodes that are not visible in the viewport. Each node may represent a person within an organization and their relative position is determined based upon their organizational position and reporting structure to other people within the organization.

Figure 9:
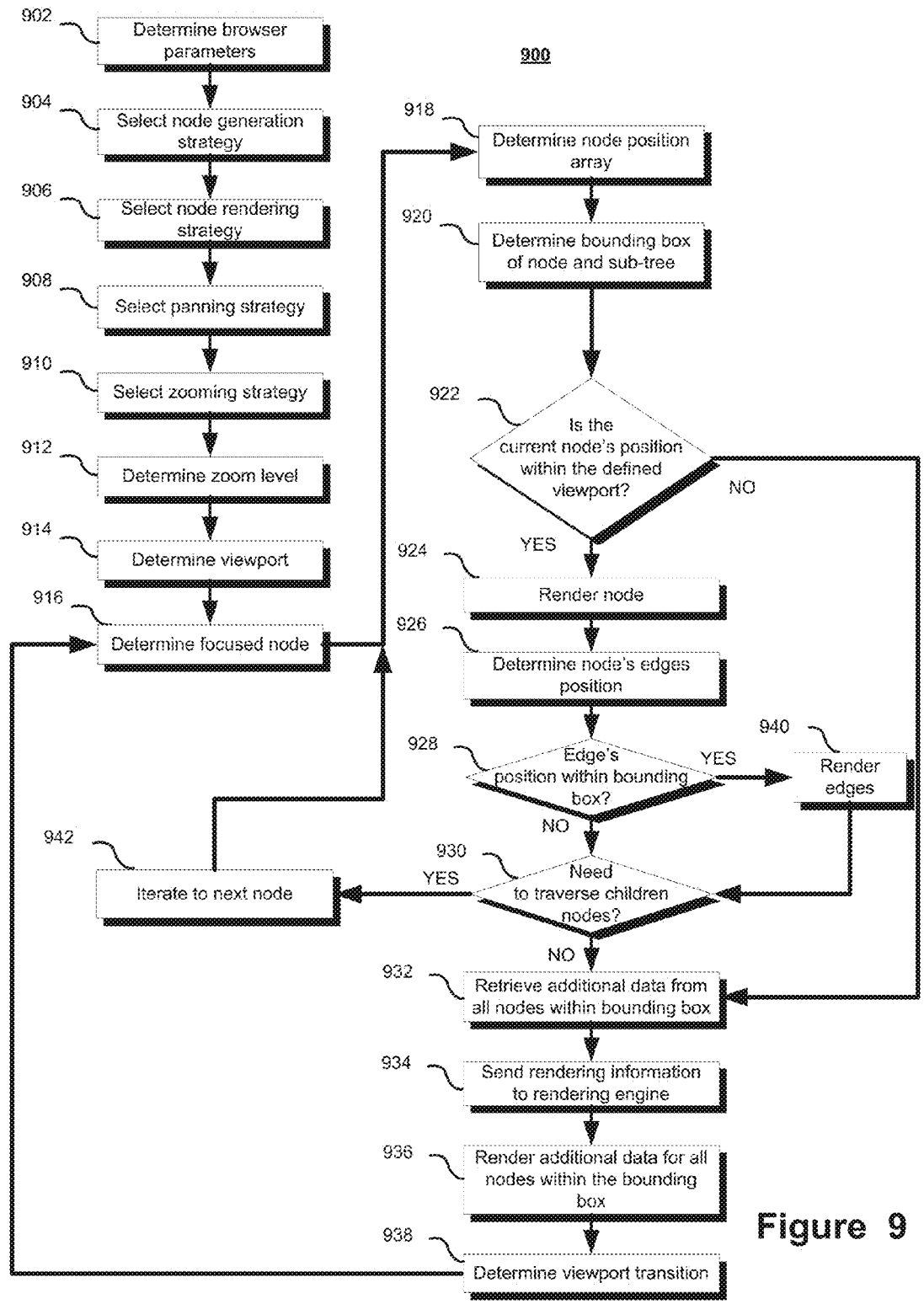
FIG. 9 is a further method of rendering hierarchical data structures.

FIG. 9 show another method of rendering of hierarchical data structures in an organization chart. The method 900 can be initiated when rendering is requested of the organizational data in a browser either executing the application or executed within an application. The rendering function may be addressed by a URI/URL directed to code or instructions for rendering the content. The organizational data can be retrieved from a hierarchical database such as for example a human resources management or talent management software containing organizational data. Parameters associated with the browser are determined (902) for rending of the chart and to optimize performance of the process. The parameters may be defined by the particular browser or by querying a configuration of the browser. The parameters may define the type of rendering capabilities, the viewport size, and device performance parameters. From the parameters which may also be provided by user selection, the rendering strategy for the canvas can be determined, such as HTML Injection, HTML, HTML5, VML Injection, SVG or a combination of generation strategies. The node generation strategy can be selected based upon the determined parameters (904). The node rendering strategy is then selected (906) which may be a one or more canvas generation technologies. The panning strategy is selected (908) to define how panning will occur within the viewport. The zooming strategy, as zooming occurs for the chart is selected (910) either as default or in relation to the determined browser parameters. The current zoom level is determined (912) based upon the initial node display strategy, for example the number of initial nodes that are shown, display or windows size, or resolution. The viewport can then be determined based upon the zoom level (914). The viewport may also be defined based upon the parameters of the accessing device, for example screen size, browser size, and processing capability. The viewport starting point is determined based upon a node focus (916) or may be initially defined based upon a predefined type of organization structure, initial setting, or based upon how the chart function was initiated. A node position array: x1, y1, x2, y2 for pos1, pos2 is determined (918) based upon defined relationship between nodes. The bounding box, bounds1, bounds2, of the node and sub-tree are determined based upon the viewport provided by the node array (920). If the current node position is within the defined viewport (YES at 922) the node is rendered (924) to the display. The edges of the node are then determined (926), if the nodes edges are within the determined bounding box (YES at 928) the edges are rendered (940), if the edges are not within the bounding box (NO at 928) it is determined if associated child nodes are also within the bounding box. The node edges may be rendered using a different canvas than the node rendering to improve performance. If children (sub-tree) nodes need to be traversed (YES at 930) the method iterates to the next node (942). If children nodes are outside of the bounding box (NO at 930) and do not need to be traversed, the children nodes in the sub-tree are clipped, additional data from all nodes within the bounding box are retrieved (932) for rendering. The rendering information from the additional node data is sent to the rendering engine (934). The additional data is rendered for all nodes within the bounding box (936). It is then determined if input is received changing the viewport requiring a transition (938) based upon movement of the organizational chart within the viewport. The transition initiates movement of the organizational chart within the viewport requiring node location to be determined. In determining a movement the position value for each node is changed from the current position to the position where it has been moved to. The node focus is then re-determined (916) and additional nodes may need to be rendered. If the current node position is within the defined viewport (NO at 922) additional node data for all nodes within the bounding box is retrieved (932) and the process continues with sending rending information to the rendering engine (934).

It will be apparent to persons skilled in the art that a number of variations and modifications can be made without departing from the scope of the invention as defined in the claims. The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments may be executed by a computer processor or similar device programmed in the manner of method steps, or may be executed by an electronic system which is provided with means for executing these steps. Similarly, an electronic memory medium such computer memory, CD-ROMS, Blu-Ray, Random Access Memory (RAM), Read Only Memory (ROM), flash memory, or similar computer software storage media known in the art, may be programmed to execute such method steps. As well, electronic signals representing these method steps may also be transmitted via a communication network.

The embodiments described above are intended to be illustrative only. The scope of the invention is therefore intended to be limited solely by the scope of the appended claims.

The invention claimed is:

1. A method of rendering hierarchical data structures via a web server that generates and displays web pages for a web browser, the method comprising:
   retrieving node data from a datastore of the web server, the datastore associated with a human resources management software residing on the web server, each item of node data representing an employee within an organization defining a hierarchical data structure;
   determining parameters associated with the web browser to thereby determine a viewport for viewing the hierarchical data structure using the web browser;
   determining coordinates for nodes in the hierarchical structure based upon relative positions in the hierarchy and a configuration of the viewport; and
   rendering each node of the data structure defined within the viewport using the parameters for rendering the hierarchical data structure to generate an organizational chart on a display of a computing device using the web browser,
   wherein for each node an array comprising (x1,y1,x2,y2) is determined, wherein x1 and y1 are associated with a starting position and x2 and y2 are associated with an ending position.

2. The method of claim 1 further comprising clipping nodes and associated sub-trees that are not visible in the viewport wherein the nodes and edges are rendered separately.

3. The method of claim 1 wherein the starting position is further associated with a first bounds value and the ending position is associated with a second bounds value, wherein bounds values define a bounding box that surrounds a node and all of its children.

4. The method of claim 3 wherein when a bounds value is outside of the viewport the node and associated sub-tree are not drawn.

5. The method of claim 1 wherein determination of position values of each node is iteratively determined, wherein when a node depending on a node having a bounds value outside of the viewport is identified; all dependent nodes are determined to be outside of the viewport therefore not requiring a position to be determined.

6. The method of claim 1 wherein determination of position values of the nodes are iteratively determined, wherein when a node depending on a node have a bounds value outside of the viewport is identified, all dependent nodes are determined to be outside of the viewport are clipped.

7. The method of claim 1 wherein the nodes are rendered by a first rendering method and edges of the nodes are rendered by a second rendering method different from the first rendering method.

8. The method of claim 1 further comprising determining an input to a user interface, wherein the input changes the viewport on the hierarchical data.

9. The method of claim 8 wherein an ending position value is copied to a starting position values and new ending position values are determined.

10. The method of claim 1 further comprising determining a change in zoom level of the hierarchical data structure, wherein the change in zoom level modifies the viewport of the data, wherein node positions are re-determined in response to the change.

11. The method of claim 1 wherein the nodes are rendered using one or more canvases selected from a group comprising:
   HTML injection canvas
   HTML canvas;
   HTML5 canvas;
   VML injection canvas; and
   SVG canvas.

12. The method of claim 1 wherein for each zoom level associated data is retrieved from the human resources management software, wherein higher levels of zoom provide more detail for each node in the organization chart.

13. The method of claim 1 where in each node may represent a person within an organization and their relative position is determined based upon their organizational position and reporting structure to other people within the organization.

14. The method of claim 1 wherein edges of the node are determined, wherein if an edge of a node is within a bounding box the edge is rendered.

15. The method of claim 14 wherein if an edge of a node is outside of the bounding box it is determined if children nodes associated with a sub-tree of the node are within the bounding box, wherein nodes that are within the bounding box are rendered and nodes outside of the bounding box are clipped.

16. The method of claim 1 wherein additional node data is retrieved and rendered after rendering of the node and node edges.

17. The method of claim 1 further comprising:
   determining a bounding box for a current node and a sub-tree of associated nodes;
   determining if the node is within the viewport;
   rendering the node;
   determining if node edges are within the bounding box;
   wherein if an edge of the node is outside of the bounding box determining if child nodes in the sub-tree are within the viewport wherein child nodes with edges within the viewport are rendered;
   rendering edges of the node within the viewport;
   retrieving additional data for each node once all nodes within the viewport are rendered; and
   rendering the additional data for each node.

18. A non-transitory computer readable memory containing instructions for rendering hierarchical data structures via a web server that generates and displays web pages for a web browser which when executed by a processor perform:
  retrieving node data from a datastore of the web server, the datastore associated with a human resources management software residing on the web server, each item of node data representing an employee within an organization defining a hierarchical data structure;
  determining parameters associated with the web browser to thereby determine a viewport for viewing the hierarchical data structure using the web browser;
  determining coordinates for nodes in the hierarchical structure based upon relative positions in the hierarchy and a configuration of the viewport;
  rendering each node of the data structure defined within the viewport using the parameters for rendering the hierarchical data structure to generate an organizational chart on a display of a computing device using the web server,
  wherein for each node an array comprising (x1,y1,x2,y2) is determined, wherein x1 and y1 are associated with a starting position and x2 and y2 are associated with an ending position.

* * * * *